United States Patent
Wang et al.

(10) Patent No.: US 8,525,887 B2
(45) Date of Patent: Sep. 3, 2013

(54) IMAGE PICKUP SYSTEM

(75) Inventors: Sheng-Ping Wang, Taipei (TW);
Tung-Hsuan Pai, Taipei (TW);
Sheng-Ling Huang, Taipei (TW);
Ying-Jieh Huang, Taipei (TW);
Tzu-Hung Cheng, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 470 days.

(21) Appl. No.: 12/875,883

(22) Filed: Sep. 3, 2010

(65) Prior Publication Data

US 2012/0007993 A1    Jan. 12, 2012

(30) Foreign Application Priority Data

Jul. 9, 2010   (TW) ............................... 99122619 A (51) Int. Cl.
*H04N 5/225*    (2006.01)

(52) U.S. Cl.
USPC .................................... 348/207.99; 348/373

(58) Field of Classification Search
USPC ........................................ 348/207.9, 373, 9
See application file for complete search history.

(56) References Cited

U.S. PATENT DOCUMENTS

2007/0262148 A1* 11/2007 Yoon et al. ..................... 235/454
2010/0231733 A1*  9/2010 Dobashi et al. ............ 348/208.4

* cited by examiner

*Primary Examiner* — Sinh Tran
*Assistant Examiner* — Selam Gebriel
(74) *Attorney, Agent, or Firm* — Kirton McConkie; Evan R. Witt (57) ABSTRACT

An image pickup system includes a display screen, an image pickup device and a positioning program. The image pickup device is used for shooting a document. The display screen is used for showing a positioning mark. When the document is moved and a pre-shot document image is aligned with the positioning mark, the image pickup device is activated by the positioning program to shoot the document, thereby obtaining a document image.

8 Claims, 6 Drawing Sheets

IMAGE PICKUP SYSTEM

FIELD OF THE INVENTION

The present invention relates to an image pickup system, and more particularly to an image pickup system for acquiring a document image.

BACKGROUND OF THE INVENTION

Generally, image pickup devices are used to take photographs or make video conferences. With increasing development of the digital techniques, documents are gradually created as electronic files. Conventionally, the documents are scanned by scanning apparatuses and then saved as electronic files such as PDF (Portable Document Format) files. For most companies, the scanning apparatuses are essential apparatuses. For some companies, the scanning apparatuses are not necessarily purchased. In other words, the applications of the scanning apparatuses to create electronic files are limited.

Recently, a method has been proposed for creating electronic files of simple documents (e.g. single-sided papers or business cards) without the need of using the scanning apparatus. In this method, an image pickup device is served as a peripheral device of the computer to capture the image of the document. The captured image of the document is saved as an electronic file. This electronic file is an image file such as a JPEG (Joint Photographic Experts Group) file.

As known, optical character recognition (OCR) is a process of capturing an image of a document and then extracting the characters from the image. Recently, it is possible to analyze images that are captured from the image pickup device by the OCR technique and saved as image files. As a consequence, individual characters or signs contained in the images files are recognized and converted as editable text files. Since the associated OCR techniques are well established, the image pickup device is gradually adopted to obtain electronic files of the documents.

However, when an image pickup device is used to shoot a business card, some difficulties possibly occur. For example, it is critical to hold the document steady. Since the common web camera (i.e. an image pickup device) installed in a computer has a preset focal length of approximately 60 centimeters, this kind of image pickup device is feasible to shoot the facial expression of the user rather than the document. When the user wants to shoot an article contained in a document by the image pickup device, if this document is held by the user's hand, the document should be moved to the focusing position (i.e. an optimal shooting position). Due to the rocking of the user's hand, the obtained document image is usually blurred. For avoiding moving the document by hand every time and preventing from obtaining a blurred document image due to the rocking of the user's hand, a static document stand is used for holding the document steady to obtain a sharp document image. It is noted that the location of the document stand is dependent on the focal lens of the image pickup device. The use of the document stand, however, incurs another problem. That is, the document stand should be placed in a fixed location. In a case that the document stand is used in other places, the user should carry the document stand, which is very troublesome to the user.

For convenience, the document is directly placed on a working plane (e.g. a desk plane) without the need of the document stand. In addition, the notebook computer having an image pickup device is used for shooting the document. After the document is placed on a proper location of the working plane, the upper cover of the notebook computer is rotated such that the image capturing device installed on the upper cover is close to the document. Meanwhile, the document may be shot by the image capturing device, and thus the document image is acquired. However, when the image capturing device of the notebook computer is used to capture the image of the document placed on the working plane, some drawbacks also occur. The common drawback is occurrence of a distorted image. If the shooting range of the image capturing device is insufficient, the image captured by the image capturing device for a single time is usually incomplete. For solving this drawback, the user usually shoot document for two times in order to obtain two incomplete images. By means of image processing techniques, these two incomplete images are combined together. In other words, after the upper-half portion of the document is shot by the image capturing device, the document should be moved to have the lens of the image capturing device align aligned with the lower-half portion of the document in order to shoot the lower-half portion. Since there is no reliable reference tool or reference point on the document, the document is readily aslant during movement of the document. Consequently, the document posterior to movement fails to be parallel with the original document or located at the same level as the original document. Due to the distorted image, the image of the lower-half portion of the document is distorted and fails to be successfully combined with the upper-half portion of the document. For obtaining a sharp image, it is necessary to re-shoot the document.

Therefore, there is a need of providing an image pickup system for judging whether the document is at the optimal shooting position without the need of using a document stand.

SUMMARY OF THE INVENTION

The present invention provides an image pickup system without the need of using a document stand.

The present invention further provides an image pickup system for judging whether the document is at the optimal shooting position.

In accordance with an aspect of the present invention, there is provided an image pickup system for shooting a handheld document to obtain a document image. The image pickup system includes a display screen, an image pickup device and a positioning program. The display screen is used for showing a preview interface. The preview interface includes a preview window and a positioning mark. The preview window is used for showing a pre-shot document image corresponding to the document. The positioning mark is shown on the preview window, and includes a first borderline. The first borderline has a first length. The image pickup device is used for shooting the document. The positioning program is used for judging whether the pre-shot document image is aligned with the positioning mark. When the pre-shot document image is shown on the preview window, a window-entering message is shown on the preview window. When the pre-shot document image is contacted with the positioning mark, an approaching message is shown on the preview window. When a first image edge of the pre-shot document image is aligned with the first borderline and a first image edge length of the first image edge is equal to the first length, an aligning message is shown on the preview window and the image pickup device is activated to shoot the document to obtain the document image.

In an embodiment, the positioning mark further includes a second borderline and a third borderline. The second borderline is arranged at a first end of the first borderline and perpendicular to the first borderline. The third borderline is arranged at a second end of the first borderline and perpendicular to the first borderline. When the first image edge of the pre-shot document image is aligned with the first borderline, the second borderline is aligned with a second image edge of the pre-shot document image and the third borderline is aligned with a third image edge of the pre-shot document image.

In an embodiment, the preview interface further includes a document size window for providing a first-size document selective item and a second-size document selective item. When the first-size document selective item is selected, the first image edge of the pre-shot document image is aligned with the first borderline and the first image edge length of the first image edge is equal to the first length, a distance between the document and the image pickup device is equal to a first focal length. When the second-size document selective item is selected, the first image edge of the pre-shot document image is aligned with the first borderline and the first image edge length of the first image edge is equal to the first length, the distance between the document and the image pickup device is equal to a second focal length.

In an embodiment, the first-size document selective item is a business card selective item, the second-size document selective item is an A4-size document selective item, and the first focal length is shorter than the second focal length.

In an embodiment, the preview interface further includes a shooting mode switching selective item. When the shooting mode switching selective item is selected, the image pickup device is switched from an automatic shooting mode to a manual shooting mode, or the image pickup device is switched from the manual shooting mode to the automatic shooting mode.

In accordance with another aspect of the present invention, there is provided an image pickup system for shooting a handheld document to obtain a document image. The image pickup system includes a display screen, an image pickup device and a positioning program. The display screen is used for showing a preview interface. The preview interface includes a preview window and a positioning mark. The preview window is used for showing a pre-shot document image corresponding to the document. The positioning mark is shown on the preview window, and includes a first borderline, a second borderline and a third borderline. The first borderline is perpendicular to the second borderline. The first borderline is parallel with the third borderline. The image pickup device is used for shooting the document. The positioning program is used for judging whether the pre-shot document image is aligned with the positioning mark. When the pre-shot document image is shown on the preview window, a window-entering message is shown on the preview window. When the pre-shot document image is contacted with the positioning mark, an approaching message is shown on the preview window. When a first image edge, a second image edge and a third image edge of the pre-shot document image are respectively aligned with the first borderline, the second borderline and the third borderline, an aligning message is shown on the preview window and the image pickup device is activated to shoot the document to obtain the document image.

In an embodiment, the first borderline and the second borderline intersect with each other, and a distance between the first borderline and the third borderline is equal to a length of the second image edge of the pre-shot document image.

In an embodiment, the preview interface further includes a document size window for providing a first-size document selective item and a second-size document selective item. When the first-size document selective item is selected and the first image edge, the second image edge and the third image edge of the pre-shot document image are respectively aligned with the first borderline, the second borderline and the third borderline, a distance between the document and the image pickup device is equal to a first focal length. When the second-size document selective item is selected and the first image edge, the second image edge and the third image edge of the pre-shot document image are respectively aligned with the first borderline, the second borderline and the third borderline, the distance between the document and the image pickup device is equal to a second focal length.

In an embodiment, the first-size document selective item is a business card selective item, the second-size document selective item is an A4-size document selective item, and the first focal length is shorter than the second focal length.

In an embodiment, the preview interface further includes a shooting mode switching selective item. When the shooting mode switching selective item is selected, the image pickup device is switched from an automatic shooting mode to a manual shooting mode, or the image pickup device is switched from the manual shooting mode to the automatic shooting mode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
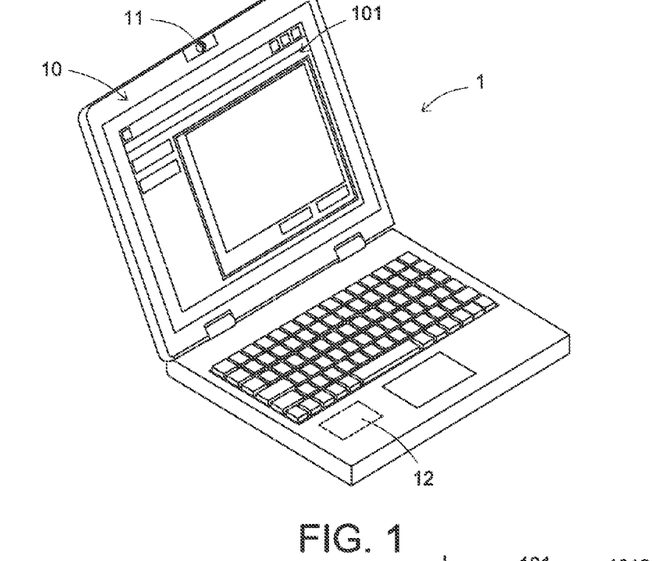
FIG. 1 is a schematic diagram illustrating an image pickup system according to a first embodiment of the present invention.

FIG. 1 is a schematic diagram illustrating an image pickup system according to a first embodiment of the present invention. The image pickup system 1 is used for shooting a first document B (see FIG. 3) that is held by a user, thereby obtaining a document image. As shown in FIG. 1, the image pickup system 1 comprises a display screen 10, an image pickup device 11 and a positioning program 12. The display screen 10 is used for showing a preview interface 101. The image pickup device 11 is used for shooting the first document B. The positioning program 12 is executed to judge whether the first document B is at the optimal shooting position. When the positioning program 12 judges that the first document B is at the optimal shooting position, the image pickup device 11 is activated by the positioning program 12, and thus the first document B is automatically shot by the image pickup device 11. In this embodiment, the image pickup system 1 is a notebook computer, the image pickup device 11 is a web camera installed on the notebook computer, and the first document B is a business card.

Figure 2:
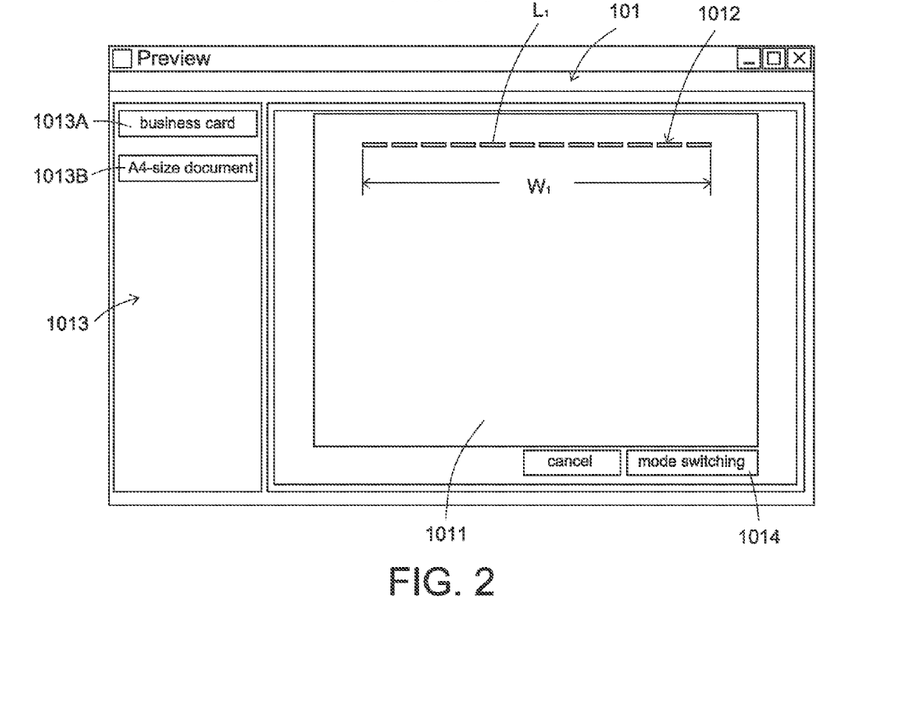
FIG. 2 is a schematic diagram illustrating a preview interface of the image pickup system according to the first embodiment of the present invention.

FIG. 2 is a schematic diagram illustrating a preview interface of the image pickup system according to the first embodiment of the present invention. The preview interface 101 comprises a preview window 1011, a positioning mark 1012, a document size window 1013 and a shooting mode switching selective item 1014. When the image pickup device 11 performs a pre-shooting operation on the first document B, a first pre-shot document image I1 is shown on the preview window 1011 (see FIGS. 4A and 4B). The positioning mark 1012 is shown on the preview window 1011. By referring to the positioning mark 1012, the user may move the first document B to a first optimal shooting position (see FIG. 3). In this embodiment, the positioning mark 1012 has a first borderline L1. The first borderline L1 has a first length W1.

Please refer to FIG. 2 again. The document size window 1013 provides a first-size document selective item 1013A and a second-size document selective item 1013B. When the first-size document selective item 1013A is selected, the image pickup device 11 is set to have a first focal length F1. When the second-size document selective item 1013B, the image pickup device 11 is set to have a second focal length F2. In this embodiment, the first-size document selective item 1013A is a business card selective item, and the second-size document selective item 1013B is an A4-size document selective item, wherein the first focal length F1 is shorter than the second focal length F2. By selecting the shooting mode switching selective item 1014, the shooting mode of the image pickup device 11 is switched. For example, the shooting mode of the image pickup device 11 is switched from an automatic shooting mode to a manual shooting mode; or the shooting mode of the image pickup device 11 is switched from the manual shooting mode to the automatic shooting mode. As such, the image pickup device 11 may be operated in a desired shooting mode to shoot the document according to the practical requirements.

A process of shooting the first document by the image pickup system of the present invention will be illustrated as follows. When the user wants to shoot the first document B by the image pickup system 1, the image pickup device 11 should be firstly activated and the preview interface 101 is shown on the display screen 10. Then, the first-size document selective item 1013A is selected from the document size window 1013, so that the image pickup device 11 is set to have a first focal length F1. In addition, the positioning mark 1012 complies with the first pre-shot document image I1 of the first document B. The contents of the preview interface 101 are shown in FIG. 2.

Figure 3:
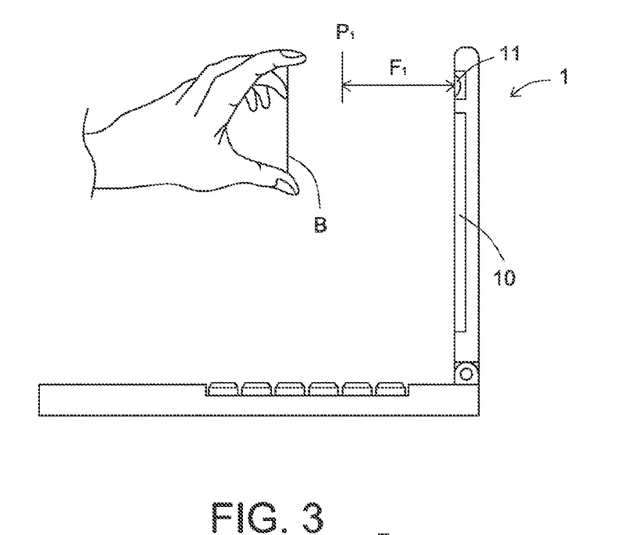
FIG. 3 is a schematic side view illustrating the use of the image pickup system according to the first embodiment of the present invention to shoot the first document.
Figure 4A:
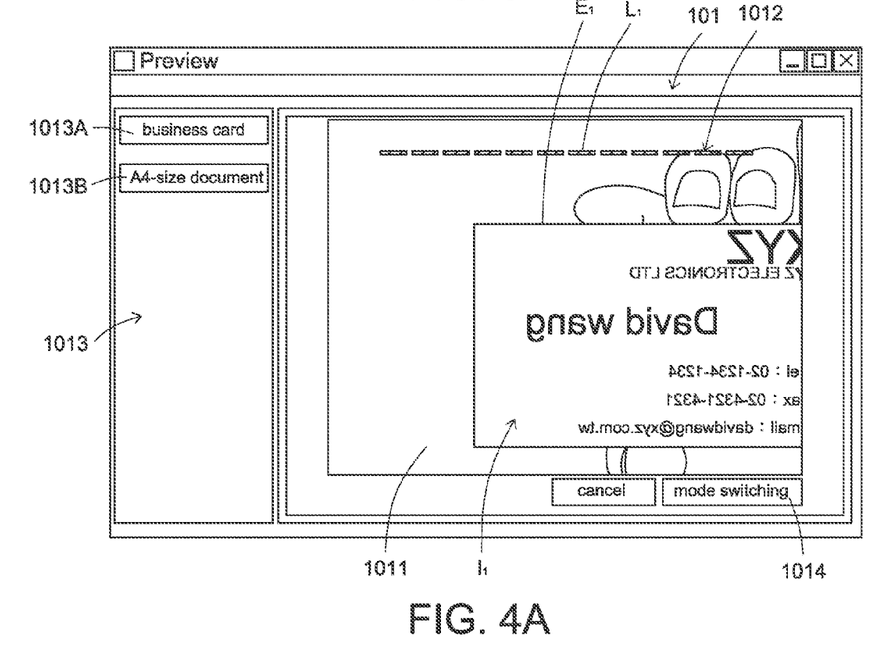
FIGS. 4A, 4B and 4C are schematic diagrams illustrating the preview interfaces during the process of shooting the first document by the image pickup system according to the first embodiment of the present invention.
Figure 4B:
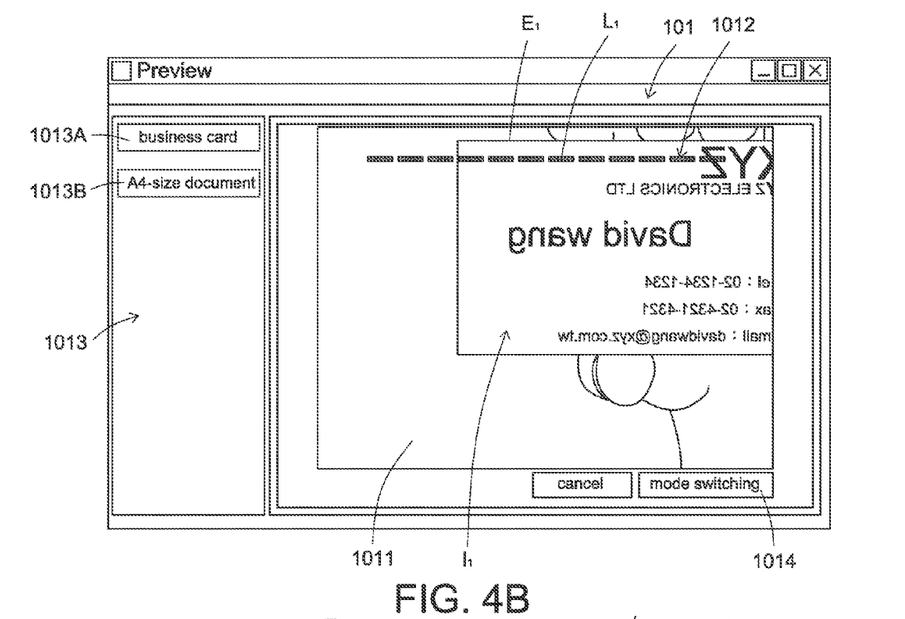
Figure 4C:
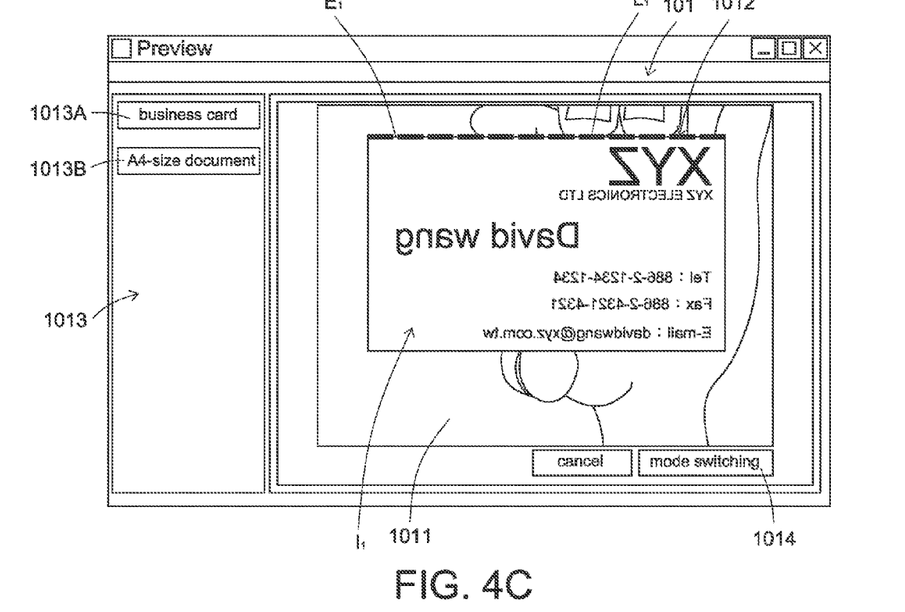

FIG. 3 is a schematic side view illustrating the use of the image pickup system according to the first embodiment of the present invention to shoot the first document. FIGS. 4A, 4B and 4C are schematic diagrams illustrating the preview interfaces during the process of shooting the first document by the image pickup system according to the first embodiment of the present invention. Please refer to FIGS. 3, 4A, 4B and 4C. In FIG. 3, the first document B is held by the user's hand and then the first document B is moved to be right in front of the image pickup device 11. As such, a first pre-shot document image I1 corresponding to the first document B is shown on the preview window 1011. The first pre-shot document image I1 has a first image edge E1. Meanwhile, the positioning program 12 judges that the first pre-shot document image I1 has entered the preview window 1011, and thus a window-entering message is shown on the preview interface 101. The window-entering message may be expressed by a color, a sound or a display field. In this embodiment, the window-entering message is expressed by a specified color of the positioning mark 1012. For example, if the first pre-shot document image I1 has not been shown on the preview window 1011, the positioning mark 1012 is transparent and colorless. Whereas, as shown in FIG. 4A, when the first pre-shot document image I1 is shown on the preview window 1011, the window-entering message is expressed by showing a first color (e.g. a blue color) of the positioning mark 1012.

Next, if the user wants to move the first document B to the first optimal shooting position P1, the user may move the first document B according to the position of the positioning mark 1012 in the preview window 1011. In such way, the first pre-shot document image I1 is moved toward the positioning mark 1012. When the first pre-shot document image I1 is contacted with the positioning mark 1012, the positioning program 12 judges that the first pre-shot document image I1 is contacted with the positioning mark 1012, and thus an approaching message is shown on the preview window 1011. Similarly, the approaching message may be expressed by a color, a sound or a display field. In this embodiment, the approaching message is expressed by a specified color of the positioning mark 1012. As shown in FIG. 4B, when the first pre-shot document image I1 is contacted with the positioning mark 1012, the approaching message is expressed by switching the positioning mark 1012 from the originally first color to a second color (e.g. a green color).

Then, as the first document B is continuously moved, the first image edge E1 of the first pre-shot document image I1 is aligned with the first borderline L1 of the positioning mark 1012, and the length of the first image edge E1 is equal to the first length W1 of the first borderline L1. Meanwhile, the positioning program 12 judges that the first pre-shot document image I1 is aligned with the positioning mark 1012, and thus an aligning message is shown on the preview window 1011. In this embodiment, the aligning message is expressed by a specified color of the positioning mark 1012. As shown in FIG. 4C, when the first image edge E1 of the first pre-shot document image I1 is aligned with the first borderline L1 of the positioning mark 1012 and the length of the first image edge E1 is equal to the first length W1 of the first borderline L1, the aligning message is expressed by switching the positioning mark 1012 from the originally second color to a third color (e.g. a red color).

Moreover, after the aligning message is shown on the preview window 1011, the image pickup device 11 is activated by the positioning program 12 to shoot the first document B, thereby obtaining a first document image. In this situation, the distance between the first document B and the image pickup device 11 is equal to the first focal length F1. That is, since the first document B is at the first optimal shooting position P1 with respect to the image pickup device 11, the first document image obtained by the image pickup device 11 is the sharpest.

Please refer to FIG. 2 again. A process of shooting the second document by the image pickup system of the present invention will be illustrated as follows. When the user wants to shoot a second document D by the image pickup system 1, the second-size document selective item 1013B is selected from the document size window 1013, so that the image pickup device 11 is set to have a second focal length F2. In addition, the positioning mark 1012' complies with the second pre-shot document image I2 of the second document D (see FIG. 6A). In this embodiment, the positioning mark 1012' has a first borderline L1'. The first borderline L1' has a first length W1'.

Figure 5:
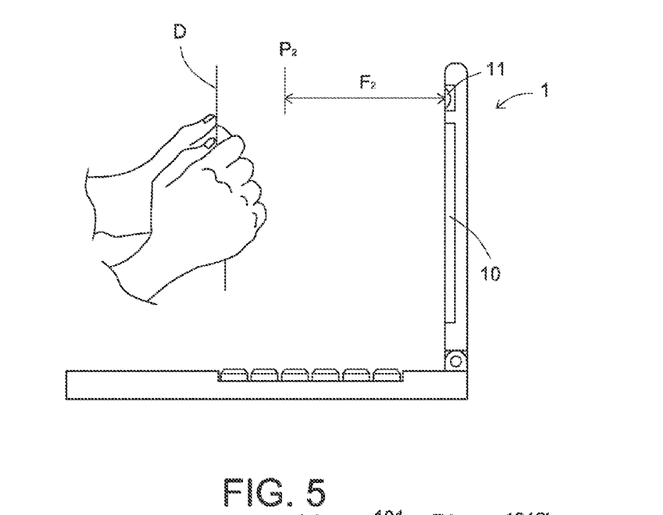
FIG. 5 is a schematic side view illustrating the use of the image pickup system according to the first embodiment of the present invention to shoot the second document.
Figure 6A:
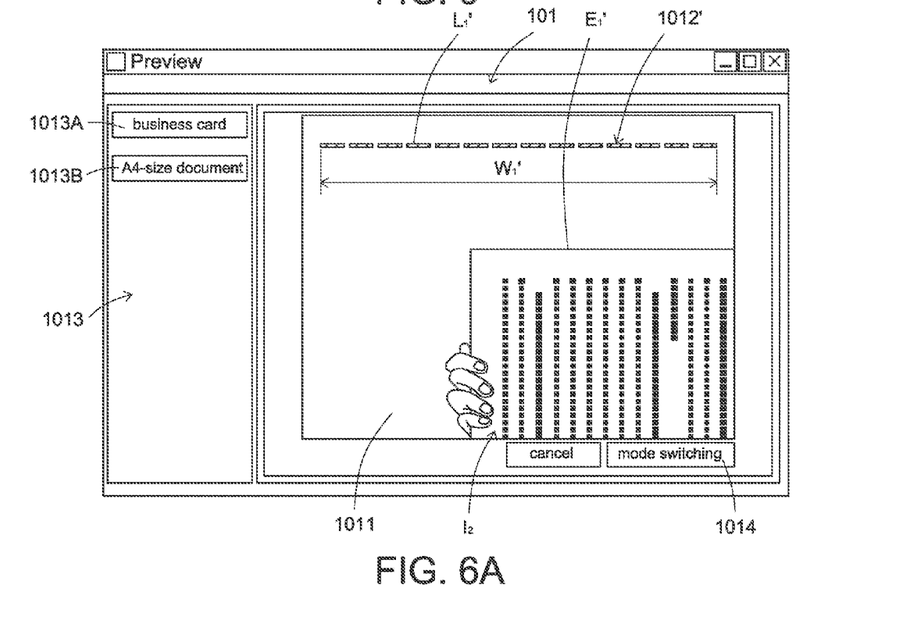
FIGS. 6A, 6B and 6C are schematic diagrams illustrating the preview interfaces during the process of shooting the second document by the image pickup system according to the first embodiment of the present invention.
Figure 6B:
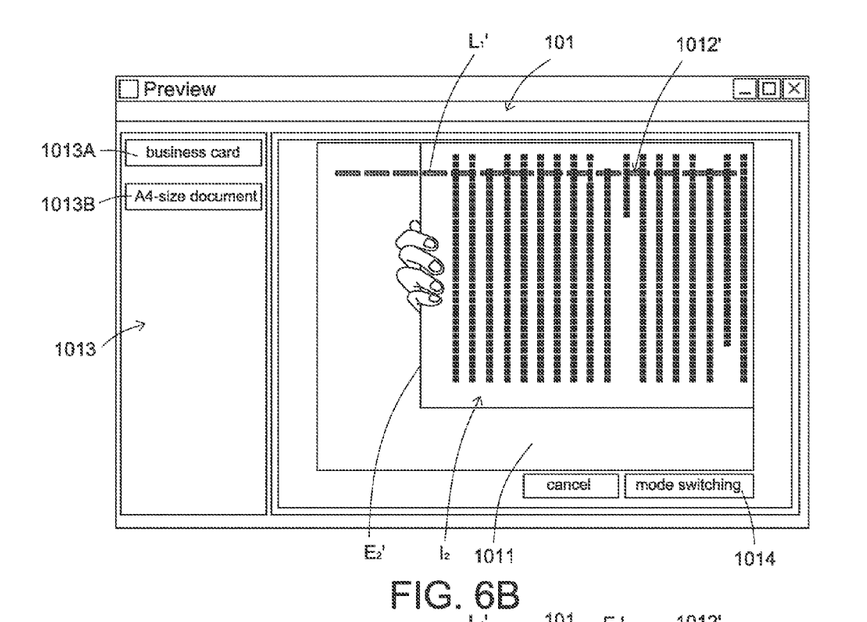
Figure 6C:
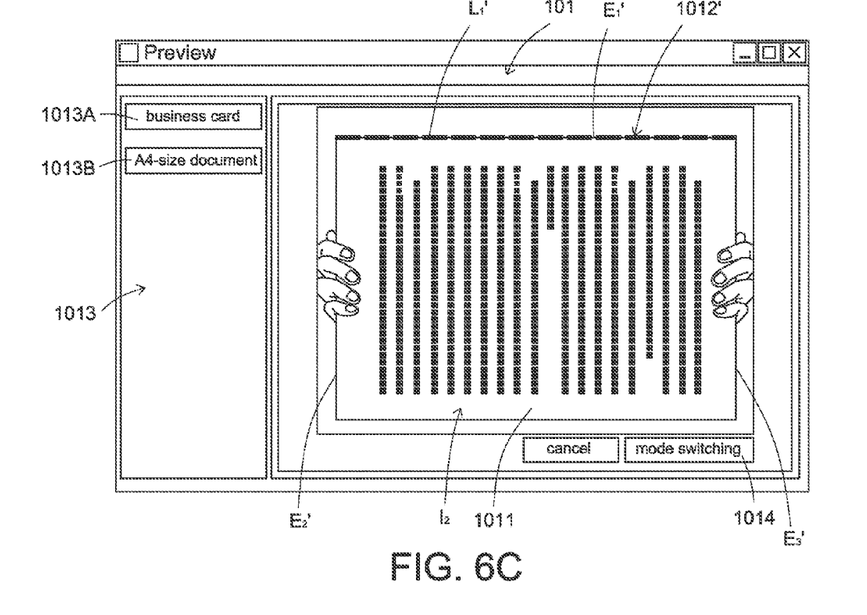

FIG. 5 is a schematic side view illustrating the use of the image pickup system according to the first embodiment of the present invention to shoot the second document. FIGS. 6A, 6B and 6C are schematic diagrams illustrating the preview interfaces during the process of shooting the second document by the image pickup system according to the first embodiment of the present invention. Please refer to FIGS. 5, 6A, 6B and 6C. As shown in FIG. 5, the second document D is held by the user's hand and then the second document D is moved to be right in front of the image pickup device 11. As such, a second pre-shot document image I2 corresponding to the second document D is shown on the preview window 1011. The second pre-shot document image I2 has a first image edge E1'. Meanwhile, the positioning program 12 judges that the second pre-shot document image I2 has entered the preview window 1011, and thus a window-entering message is shown on the preview interface 101. As shown in FIG. 6A, when the second pre-shot document image I2 is shown on the preview window 1011, the window-entering message is expressed by switching the positioning mark 1012' from the originally transparent and colorless status to a first color (e.g. a blue color).

Next, if the user wants to move the second document D to the second optimal shooting position P2, the user may move the second document D according to the position of the positioning mark 1012' in the preview window 1011. In such way, the second pre-shot document image I2 is moved toward the positioning mark 1012'. When the second pre-shot document image I2 is contacted with the positioning mark 1012', the positioning program 12 judges that the second pre-shot document image I2 is contacted with the positioning mark 1012', and thus an approaching message is shown on the preview window 1011. As shown in FIG. 6B, when the second pre-shot document image I2 is contacted with the positioning mark 1012', the approaching message is expressed by switching the positioning mark 1012' from the originally first color to a second color (e.g. a green color).

Then, as the second document D is continuously moved, the first image edge E1' of the second pre-shot document image I2 is aligned with the first borderline L1' of the positioning mark 1012', and the length of the first image edge E1' is equal to the first length W1' of the first borderline L1'. Meanwhile, the positioning program 12 judges that the second pre-shot document image I2 is aligned with the positioning mark 1012, and thus an aligning message is shown on the preview window 1011. As shown in FIG. 6C, when the first image edge E1' of the second pre-shot document image I2 is aligned with the first borderline L1' of the positioning mark 1012' and the length of the first image edge E1' is equal to the first length W1' of the first borderline L1', the aligning message is expressed by switching the positioning mark 1012' from the originally second color to a third color (e.g. a red color).

Moreover, after the aligning message is shown on the preview window 1011, the image pickup device 11 is activated by the positioning program 12 to shoot the second document D, thereby obtaining a second document image. In this situation, the distance between the second document D and the image pickup device 11 is equal to the second focal length F1. That is, since the first document B is at the second optimal shooting position P2 with respect to the image pickup device 11, the second document image obtained by the image pickup device 11 is the sharpest.

From the above description, by referring to the positioning mark 1012 or 1012' of the preview interface 101 of the image pickup system 1 of the present invention, the first document B or the second document D may be moved to the optimal shooting position according to the positioning mark 1012 or 1012' in order to acquire a sharp document image. In the above embodiment, the document size window 1013 provides a first-size document selective item 1013A corresponding to the first document B (e.g. a business card) and a second-size document selective item 1013B corresponding to the second document D (e.g. an A4-size document). Nevertheless, the document size window 1013 may provide other selective items corresponding to other-size documents (e.g. an A3-size document or a Letter-size document).

It is noted that the positioning program 12 of the image pickup system 1 may recognize whether the pre-shot document images I2 are respectively aligned with the positioning mark 1012 and 1012' according to an optical character recognition (OCR) technique. As a consequence, the positioning program 12 can judge whether the first document B or the second document D is at the optimal shooting position. Moreover, the image pickup device 11 of the image pickup system 1 is preset to be operated in an automatic shooting mode. When the aligning message is shown on the preview interface 101, the image pickup device 11 will automatically shoot the first document B or the second document D to obtain the document image. On the other hand, when the image pickup system 1 is in a manual shooting mode, the user may activate the image pickup device 11 by inputting an activation command to the image pickup system 1 (for example pressing the "ENTER" key of the notebook computer). After the image pickup system 1 is activated, the first document B or the second document D is shot to obtain the document image. Of course, when the image pickup system 1 is in a manual shooting mode, even if the aligning message is shown on the preview interface 101, the image pickup device 11 does not shoot the first document B or the second document D.

Figure 7:
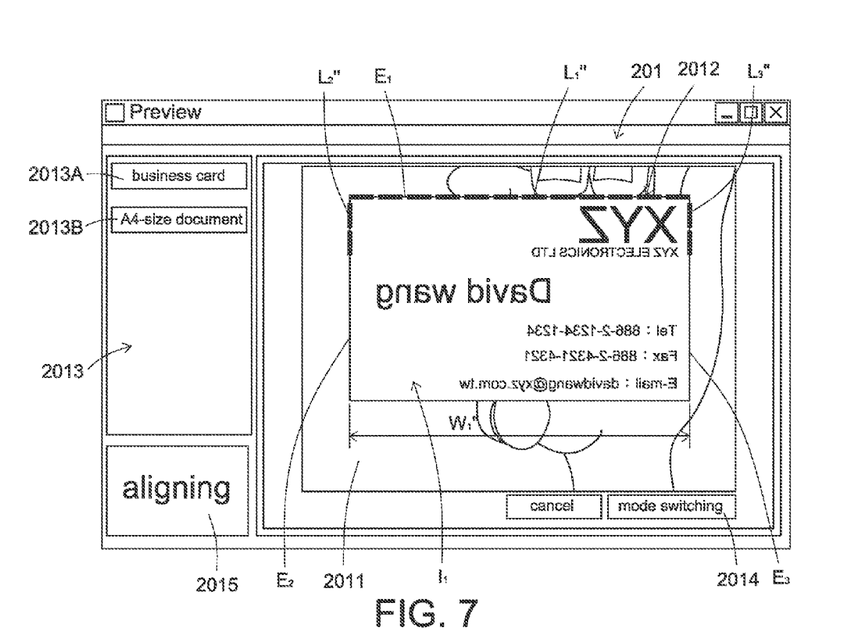
FIG. 7 is a schematic diagram illustrating a preview interface of the image pickup system according to a second embodiment of the present invention.

Moreover, the present invention further provides an image pickup system according to a second embodiment. In the second embodiment, the image pickup system comprises a display screen, an image pickup device and a positioning program. The functions of the display screen, the image pickup device and the positioning program of the second embodiment are similar to those of the first embodiment, and are not redundantly described herein. In comparison with the first embodiment, the preview interface 201 shown on the display screen is distinguished. FIG. 7 is a schematic diagram illustrating a preview interface of the image pickup system according to a second embodiment of the present invention. As shown in FIG. 7, the preview interface 201 comprises a preview window 2011, a positioning mark 2012, a document size window 2013, a shooting mode switching selective item 2014 and a status display field 2015. When the image pickup device 11 performs a pre-shooting operation on the first document B (see FIG. 3), a first pre-shot document image I1 is shown on the preview window 2011. The positioning mark 2012 is shown on the preview window 2011. The positioning mark 2012 comprises a first borderline L1", a second borderline L2" and a third borderline L3". The first borderline L1" has a first length W1". The second borderline L2" is arranged at a first end of the first borderline L1" and perpendicular to the first borderline L1". The third borderline L3" is arranged at a second end of the first borderline L1" and perpendicular to the first borderline L1". That is, the third borderline L3" is parallel with the second borderline L2".

In this embodiment, the functions of the document size window 2013 and the shooting mode switching selective item 2014 are similar to those of the first embodiment, and are not redundantly described herein. The status display field 2015 is used for showing the relation between the first pre-shot document image I1 and the positioning mark 2012. That is, the window-entering message, the approaching message and the aligning message may be realized via the status display field 2015. Please refer to FIG. 7 again. As the first document B is continuously moved, the first pre-shot document image I1 is aligned with the positioning mark 2012. Meanwhile, a first image edge E1 of the first pre-shot document image I1 is aligned with the first borderline L1" of the positioning mark 2012; a second image edge E2 of the first pre-shot document image I1 is aligned with the second borderline L2" of the positioning mark 2012; and a third image edge E3 of the first pre-shot document image I1 is aligned with the third borderline L3" of the positioning mark 2012. In this situation, an aligning message is shown on the status display field 2015 to indicate that the first pre-shot document image I1 is aligned with the positioning mark 2012. As such, the image pickup device 11 is activated by the positioning program 12 to shoot the first document B, thereby obtaining a first document image.

In the first embodiment and the second embodiment, the positioning mark 2012 and the status display field 2015 are distinguished. In addition to the first borderline L1", the positioning mark 2012 further comprises the second borderline L2" and the third borderline L3". The second borderline L2" and the third borderline L3" may facilitate the user to align the first pre-shot document image I1 with the positioning mark 2012. When the approaching message is shown on the status display field 2015, the approaching message may further includes a direction prompt message to prompt the direction to move the first pre-shot document image I1. The direction prompt message is also shown on the status display field 2015.

Figure 8:
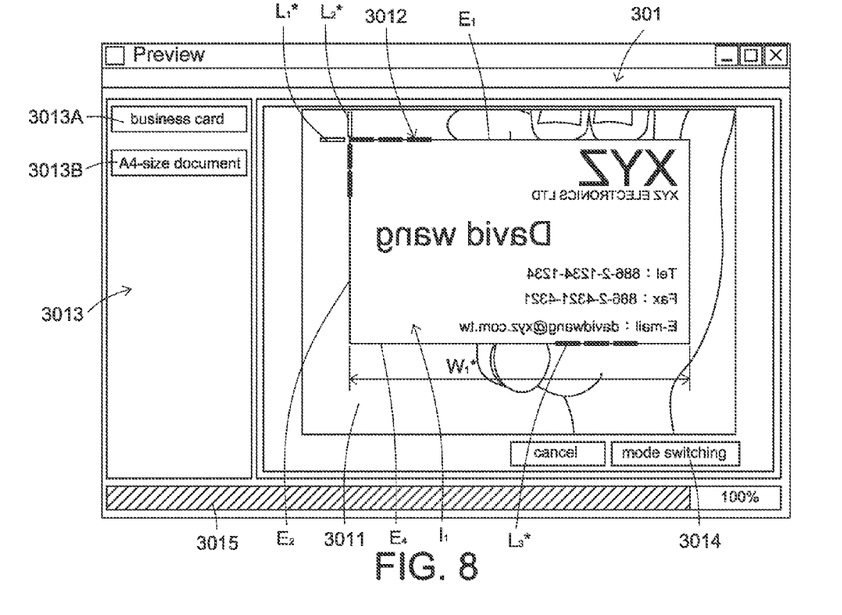
FIG. 8 is a schematic diagram illustrating a preview interface of the image pickup system according to a third embodiment of the present invention.

Moreover, the present invention further provides an image pickup system according to a third embodiment. In the third embodiment, the image pickup system comprises a display screen, an image pickup device and a positioning program. The functions of the display screen, the image pickup device and the positioning program of the second embodiment are similar to those of the first embodiment, and are not redundantly described herein. In comparison with the first embodiment, the preview interface 301 shown on the display screen is distinguished. FIG. 8 is a schematic diagram illustrating a preview interface of the image pickup system according to a third embodiment of the present invention. As shown in FIG. 8, the preview interface 301 comprises a preview window 3011, a positioning mark 3012, a document size window 3013, a shooting mode switching selective item 3014 and an approaching status display zone 3015. When the image pickup device 11 performs a pre-shooting operation on the first document B (see FIG. 3), a first pre-shot document image I1 is shown on the preview window 3011. The positioning mark 3012 is shown on the preview window 3011. The positioning mark 3012 comprises a first borderline L1*, a second borderline L2* and a third borderline L3*. The second borderline L2* is perpendicular to the first borderline L1*. The third borderline L3* is parallel with the first borderline L1*. The second borderline L2* and the first borderline L1* intersect with each other. The second borderline L2* and the third borderline L3* do not intersect with each other.

In this embodiment, the functions of the document size window 3013 and the shooting mode switching selective item 3014 are similar to those of the first embodiment, and are not redundantly described herein. The approaching status display zone 3015 is used for showing the approaching degree of the pre-shot document image I1 to the positioning mark 3012. Please refer to FIG. 8 again. As the first document B is continuously moved, the first pre-shot document image I1 is aligned with the positioning mark 3012. Meanwhile, a first image edge E1 of the first pre-shot document image I1 is aligned with the first borderline L1* of the positioning mark 3012; a second image edge E2 of the first pre-shot document image I1 is aligned with the second borderline L2* of the positioning mark 3012; and a fourth image edge E4 of the first pre-shot document image I1 is aligned with the third borderline L3* of the positioning mark 3012. In addition, the distance between the first borderline L1* and the third borderline L3* is equal to the length of the second image edge E2 of the first pre-shot document image I1. Meanwhile, the 100% occupancy percentage of the approaching status display zone 3015 of the preview interface 301 is equivalent to an aligning message indicating the alignment between the first pre-shot document image I1 and the positioning mark 3012. As such, the image pickup device 11 is activated by the positioning program 12 to shoot the first document B, thereby obtaining a first document image.

Moreover, the window-entering message, the approaching message and the aligning message shown on the preview interface 301 may be expressed to prompt the user according to the occupancy percentage of the approaching status display zone 3015. For example, the window-entering message is expressed when the occupancy percentage of the approaching status display zone 3015 exceeds 10%; the approaching message is expressed when the occupancy percentage of the approaching status display zone 3015 is ranged between 20% and 90% (depending on the approaching degree of the pre-shot document image I1 to the positioning mark 3012); and the aligning message is expressed when the occupancy percentage of the approaching status display zone 3015 is 100% (see FIG. 8).

From the above description, the image pickup system of the present invention is capable of prompting the user how to move the document by referring to the positioning mark of the preview interface. As such, the document can be moved to the optimal shooting position in order to obtain a sharp document image. Moreover, since the positioning mark occupies a small proportion of the preview window, the positioning mark is effective as a reference point for aligning the pre-shot image with the positioning mark without hindering the line of vision of the user. In addition, as described in the first embodiment, a linear positioning mark is sufficient provide the positioning function. Although the positioning mark of the third embodiment has three borderlines, these three borderlines are too short to hinder the line of vision of the user. To sum up, the image pickup system of the present invention is capable of providing a reference point for moving the document. When the document is moved to the optimal shooting position, a sharp document image is obtained.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image pickup system for shooting a handheld document to obtain a document image, said image pickup system comprising:
- a display screen for showing a preview interface, wherein said preview interface comprises:
  - a preview window for showing a pre-shot document image corresponding to said document;
  - a positioning mark shown on said preview window, and comprising a first borderline, wherein said first borderline has a first length; and
  - a document size window for providing a first-size document selective item and a second-size document selective item;
- an image pickup device for shooting said document; and
- a positioning program for judging whether said pre-shot document image is aligned with said positioning mark, wherein when said pre-shot document image is shown on said preview window, a window-entering message is shown on said preview window, wherein when said pre-shot document image is contacted with said positioning mark, an approaching message is shown on said preview window, wherein when a first image edge of said pre-shot document image is aligned with said first borderline and a first image edge length of said first image edge is equal to said first length, an aligning message is shown on said preview window and said image pickup device is activated to shoot said document to obtain said document image,
- wherein a distance between said document and said image pickup device is equal to a first focal length when said first-size document selective item is selected, said first image edge of said pre-shot document image is aligned with said first borderline and said first image edge length of said first image edge is equal to said first length, wherein said distance between said document and said image pickup device is equal to a second focal length when said second-size document selective item is selected, said first image edge of said pre-shot document image is aligned with said first borderline and said first image edge length of said first image edge is equal to said first length.

2. The image pickup system according to claim 1 wherein said positioning mark further comprises a second borderline and a third borderline, wherein said second borderline is arranged at a first end of said first borderline and perpendicular to said first borderline, and said third borderline is arranged at a second end of said first borderline and perpendicular to said first borderline, wherein when said first image edge of said pre-shot document image is aligned with said first borderline, said second borderline is aligned with a second image edge of said pre-shot document image and said third borderline is aligned with a third image edge of said pre-shot document image.

3. The image pickup system according to claim 1 wherein said first-size document selective item is a business card selective item, said second-size document selective item is an A4-size document selective item, and said first focal length is shorter than said second focal length.

4. The image pickup system according to claim 1 wherein said preview interface further comprises a shooting mode switching selective item, wherein when said shooting mode switching selective item is selected, said image pickup device is switched from an automatic shooting mode to a manual shooting mode, or said image pickup device is switched from said manual shooting mode to said automatic shooting mode.

5. An image pickup system for shooting a handheld document to obtain a document image, said image pickup system comprising:
- a display screen for showing a preview interface, said preview interface comprising:
  - a preview window for showing a pre-shot document image corresponding to said document;
  - a positioning mark shown on said preview window, and comprising a first borderline, a second borderline and a third borderline, wherein said first borderline is perpendicular to said second borderline, and said first borderline is parallel with said third borderline; and
  - a document size window for providing a first-size document selective item and a second-size document selective item;
- an image pickup device for shooting said document; and
- a positioning program for judging whether said pre-shot document image is aligned with said positioning mark, wherein when said pre-shot document image is shown on said preview window, a window-entering message is shown on said preview window, wherein when said pre-shot document image is contacted with said positioning mark, an approaching message is shown on said preview window, wherein when a first image edge, a second image edge and a third image edge of said pre-shot document image are respectively aligned with said first borderline, said second borderline and said third borderline, an aligning message is shown on said preview window and said image pickup device is activated to shoot said document to obtain said document image,
- wherein a distance between said document and said image pickup device is equal to a first focal length when said first-size document selective item is selected and said first image edge, said second image edge and said third image edge of said pre-shot document image are respectively aligned with said first borderline, said second borderline and said third borderline, wherein said distance between said document and said image pickup device is equal to a second focal length when said second-size document selective item is selected and said first image edge, said second image edge and said third image edge of said pre-shot document image are respectively aligned with said first borderline, said second borderline and said third borderline.

6. The image pickup system according to claim 5 wherein said first borderline and said second borderline intersect with each other, and a distance between said first borderline and said third borderline is equal to a length of said second image edge of said pre-shot document image.

7. The image pickup system according to claim 5 wherein said first-size document selective item is a business card selective item, said second-size document selective item is an A4-size document selective item, and said first focal length is shorter than said second focal length.

8. The image pickup system according to claim 5 wherein said preview interface further comprises a shooting mode switching selective item, wherein when said shooting mode switching selective item is selected, said image pickup device is switched from an automatic shooting mode to a manual shooting mode, or said image pickup device is switched from said manual shooting mode to said automatic shooting mode.

* * * * *